UNITED STATES PATENT OFFICE.

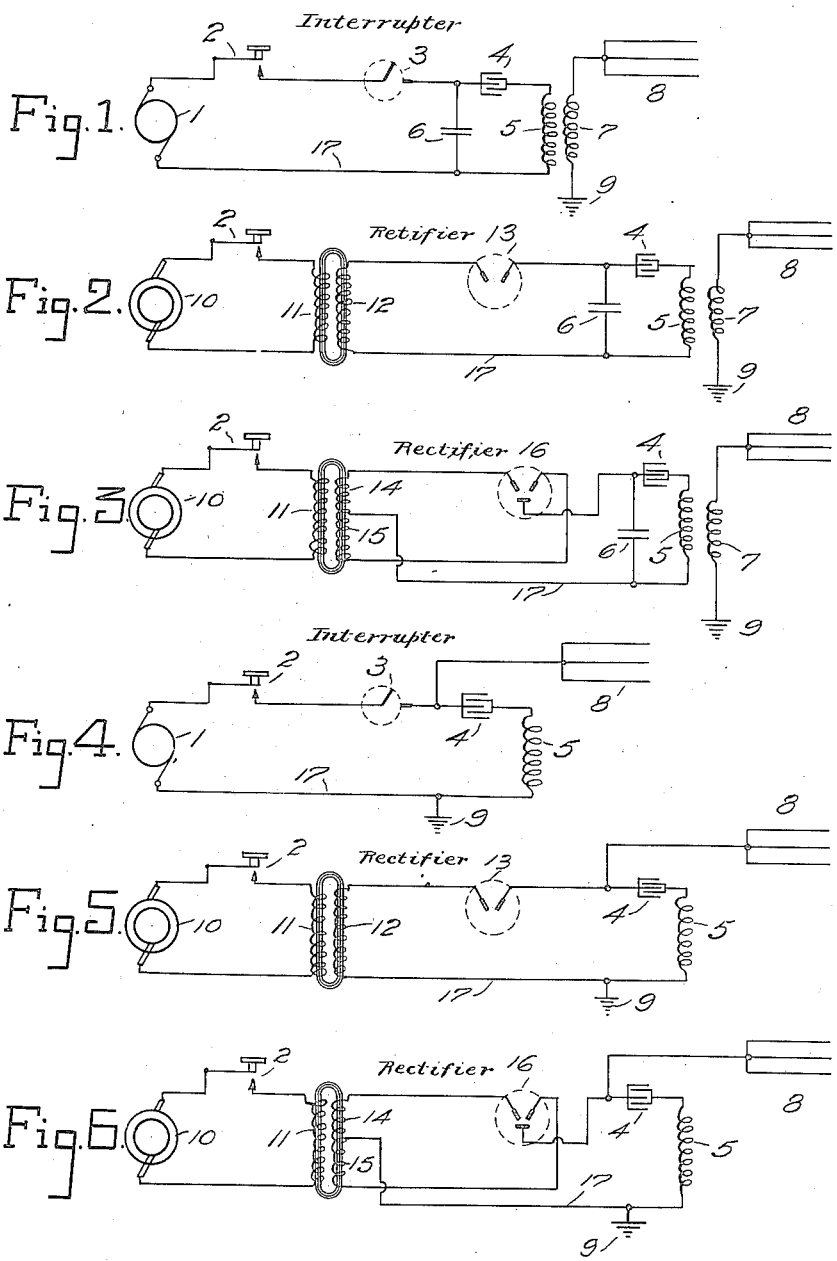

FREDERICK G. SIMPSON, OF SEATTLE, WASHINGTON.

WIRELESS TELEGRAPHY.

1,239,831.     Specification of Letters Patent.    Patented Sept. 11, 1917.

Application filed May 27, 1914. Serial No. 841,183.

*To all whom it may concern:*

Be it known that I, FREDERICK G. SIMPSON, a citizen of the United States, residing at Seattle, in the county of King and State of Washington, have invented certain new and useful Improvements in Wireless Telegraphy, of which the following is a specification.

This invention relates to radio telegraph and telephone systems.

The principal object of the invention is to provide improved means for charging the condensers used in connection with apparatus of this character and thereby to enable the charging currents to pass into the condensers but preventing the discharge from the latter through the charging circuit.

With the above and other objects in view, the invention consists in certain novel arrangements of details and combinations of parts hereinafter fully described, illustrated in the accompanying drawings, and specifically claimed.

In the accompanying drawings:

Figure 1 is a diagrammatic view showing one form of my apparatus wherein an interrupter is used and direct current employed.

Fig. 2 is a view of an arrangement using a transformer and alternating current together with a rectifier.

Fig. 3 is a modified form of the arrangement disclosed in Fig. 2.

Fig. 4 is a modified form of the arrangement shown in Fig. 1.

Fig. 5 is a second modification of the arrangement shown in Fig. 2.

Fig. 6 discloses a still further modification of the arrangement shown in Fig. 2.

Similar reference characters designate corresponding parts in the different views.

In Fig. 1 the reference numeral 1 designates a source of direct current, 2 a telegraph key or other signaling device, by which the current from said source is controlled, 3 an interrupter of any suitable type, arranged to open and close the circuits 1, 3, 4, 5, 17 and 1, 3, 6, 17, periodically. 4 and 6 are condensers; 5 an inductance coil, forming the primary of an oscillation transformer, of which 7 is the secondary coil connected in circuit with the antenna 8 and the earth 9.

In Fig. 2, 10 is the source of alternating current supply, 11 and 12 being the primary and secondary, respectively, of a transformer whereby the electric potential of the current is either raised or lowered. 13 is an alternating current rectifier of a kind which suppresses one-half of the alternating current wave. All other parts are the same as in Fig. 1.

In Figs. 1, 2 and 3 the circuit including condensers 4 and 6, and inductance 5, is herein designated "oscillation circuit". In Figs. 4, 5 and 6, antenna 8 and earth 9 replace condenser 6 in the oscillation circuit.

In the systems shown in Figs. 1 and 4, the inductance and capacity in the respective circuits 1, 2, 3, 4, 5, 17 should be so proportioned as to bring about a condition of resonance in the circuit mentioned at the frequency of interrupter 3. Circuits 12, 13, 4, 5, 17 in Figs. 2 and 5 and the circuits 14, 16, 4, 5, 17 and 15, 16, 4, 5, 17 in Figs. 3 and 6, should also be so proportioned as to inductance and capacity as to be resonant at the frequency of the charging current in condenser charges per second.

It is evident that the period of oscillation of the oscillation circuit shown in Figs. 1, 2 and 3 may be varied at will between wide limits by providing a form of variable condenser for condenser 6.

It is a well-known fact that if a condenser be placed in a charging circuit, said charging circuit having resistance, and there being a constant electro-motive force applied at the terminals of the condenser through the medium of the charging circuit, a finite length of time will elapse before the full difference of potential will be created between the terminals of the condenser.

In practice as pertaining to the herein illustrated examples I prefer to so construct interrupter 3, and rectifiers 13 and 16, as to permit the flow of a charging current into condenser 4 for a sufficient period of time, during each charging interval, to create a difference of potential at the terminals of condenser 4 slightly less than the difference of potential impressed thereon if the inductance 5 were omitted from the circuit. Condenser 6 is usually of much lower capacity than condenser 4; therefore, as it is subjected to the potential of the charging circuit for the same length of time as condenser 4, it will reach the potential thereof (practically) prior to the end of the period of charge. The action of inductance 5, however, owing to the law of resonance, and to its inertia effect upon the current drawn from the charging circuit, greatly modifies the potential difference at the terminals of condenser 4, thereby producing, at the cessation of the charge, a condition of unstability in the oscillation circuit, consisting of condenser 4, inductance 5, and condenser 6 in Figs. 1, 2 and 3; and condenser 4, inductance 5, earth 9 and antenna 8 in Figs. 4, 5 and 6, the interrupter 3 being opened at the instant of maximum charge. This condition of unstability is the initial cause of a current which oscillates within the oscillation circuit in accordance with the well known principles of resonance; said oscillations continuing until a point of electrical equilibrium is reached. With the possible exception of slight residual charges, the entire energy stored in the condensers and inductances, is dissipated by the action of the oscillating current in overcoming the resistance of the oscillation circuit, and by radiation from antenna 8.

In practice interrupter 3, and rectifiers 13 and 16 may be any of several well known types. Either mechanical, electrolytic, gaseous arcs, or others may be used. It is necessary for the attainment of the best possible results in the operation of a transmitting station, of which my arrangement of circuits and apparatus form a part, that the period, during which charging current is permitted to flow into the condensers shall be limited, as hereinabove set forth. This result can be easily accomplished with interrupters and rectifiers of the mechanical type, as close adjustment of the periods of "make" and "break" is easily secured in interrupters and rectifiers of such type by purely mechanical means.

Electrolytic interrupters and rectifiers are, to a large extent, inherently self-regulating in this respect, and if properly proportioned, will give very satisfactory results when incorporated in the hereinbefore described system of circuits. Gaseous rectifiers of the mercury vapor type are especially adaptable to my circuits when the source of power supplied is alternating. This is largely due to the possibility of constructing mercury vapor rectifiers for operation at potentials of 10,000 volts or higher. The losses therein when operated at fairly high potentials are so low as to be almost negligible.

It is evident that changes can be made in the arrangement of the circuits illustrated and described without departing from the scope of my invention as expressed in the claim, and I do not wish to be understood as being limited to the details herein shown and described.

Having described my invention, what I claim, is—

In combination, a transformer having primary and secondary coils, a generator connected to the primary coil, a three pole rectifier having two of its poles connected to opposite ends of the secondary, a condenser, a conductor connecting the third pole of the rectifier and the condenser, a second transformer primary connected in series to the condenser, a conductor connecting the transformer secondary and the second transformer primary, a second condenser, a connection between the first conductor and second condenser, and a connection between the second condenser and second conductor.

Signed at Seattle, Wash., this 19th day of May, 1914.

FREDERICK G. SIMPSON.

Witnesses:
E. PETERSON,
HORACE BARNES.